(12) United States Patent
Jo et al.

(10) Patent No.: US 11,762,486 B2
(45) Date of Patent: Sep. 19, 2023

(54) ELECTRONIC DEVICE FOR PERFORMING PLURALITY OF FUNCTIONS USING STYLUS PEN AND METHOD FOR OPERATING SAME

(71) Applicant: Samsung Electronics Co., Ltd., Suwon-si (KR)

(72) Inventors: Nammin Jo, Suwon-si (KR); Junwhon Uhm, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/715,313

(22) Filed: Apr. 7, 2022

(65) Prior Publication Data
US 2023/0065008 A1 Mar. 2, 2023

Related U.S. Application Data

(63) Continuation of application No. PCT/KR2022/003478, filed on Mar. 11, 2022.

(30) Foreign Application Priority Data

Aug. 26, 2021 (KR) .................. 10-2021-0113076

(51) Int. Cl.
*G06F 3/0354* (2013.01)
*G06F 3/038* (2013.01)
(Continued)

(52) U.S. Cl.
CPC ........ *G06F 3/03546* (2013.01); *G06F 3/0346* (2013.01); *G06F 3/0383* (2013.01);
(Continued)

(58) Field of Classification Search
CPC ...... G06F 3/03545; G06F 3/011; G06F 3/012; G02B 27/017; G02B 27/01; G02B 2027/0138; G02B 27/0172; G02B 2027/0178; G02B 27/0176; G02B 2027/014; G06T 19/006
(Continued)

(56) References Cited

U.S. PATENT DOCUMENTS

2019/0369752 A1\* 12/2019 Ikeda ..................... G06F 3/0346
2020/0042111 A1\* 2/2020 Connellan ........... G06F 3/04883
(Continued)

FOREIGN PATENT DOCUMENTS

JP        2017-091336 A    5/2017
KR   10-2006-0003252 A    1/2006
(Continued)

OTHER PUBLICATIONS

International Search Report dated Jun. 17, 2022, issued in International Patent Application No. PCT/KR2022/003478.

*Primary Examiner* — Koosha Sharifi-Tafreshi
(74) *Attorney, Agent, or Firm* — Jefferson IP Law, LLP

(57) ABSTRACT

An electronic device is provided. The electronic device includes a communication circuitry, a camera, and a processor, wherein the processor may be configured to detect at least one of a first specific color or a first specific shape from at least one surface of the stylus pen, and execute a first specific function based on the detecting of the at least one of the first specific color or the first specific shape.

18 Claims, 9 Drawing Sheets

(51) Int. Cl.
  *G06F 3/0346* (2013.01)
  *G06F 3/041* (2006.01)
  *G06F 3/044* (2006.01)
  *G06T 7/579* (2017.01)
  *G06T 19/00* (2011.01)
  *H04W 4/80* (2018.01)
  *H04N 23/51* (2023.01)

(52) U.S. Cl.
  CPC .......... *G06F 3/0441* (2019.05); *G06F 3/0442* (2019.05); *G06F 3/04162* (2019.05); *G06T 7/579* (2017.01); *G06T 19/006* (2013.01); *H04N 23/51* (2023.01); *H04W 4/80* (2018.02); *G06T 2219/2012* (2013.01)

(58) Field of Classification Search
  USPC ............................................ 345/179, 8, 633
  See application file for complete search history.

(56) References Cited

U.S. PATENT DOCUMENTS

| | | |
|---|---|---|
| 2020/0089343 A1 | 3/2020 | Kadowaki et al. |
| 2020/0272298 A1* | 8/2020 | Sugiyama ............. G06F 3/0421 |
| 2021/0294441 A1 | 9/2021 | Sung et al. |
| 2022/0308679 A1* | 9/2022 | Wu ....................... G06F 3/0484 |

FOREIGN PATENT DOCUMENTS

| | | |
|---|---|---|
| KR | 10-1630658 B1 | 6/2016 |
| KR | 10-2018-0095184 A | 8/2018 |
| KR | 10-2020-0017157 A | 2/2020 |
| KR | 10-2020-0061876 A | 6/2020 |

\* cited by examiner

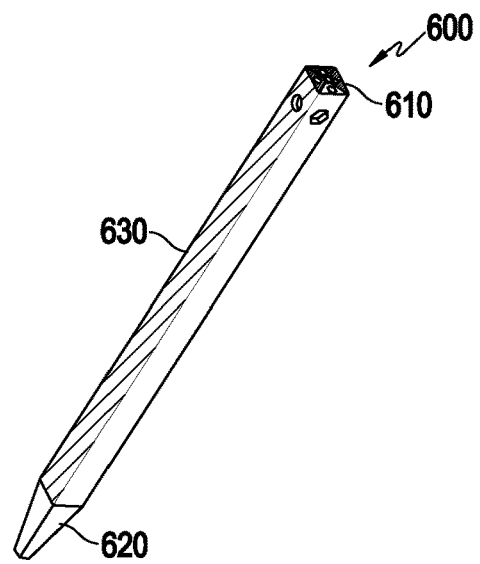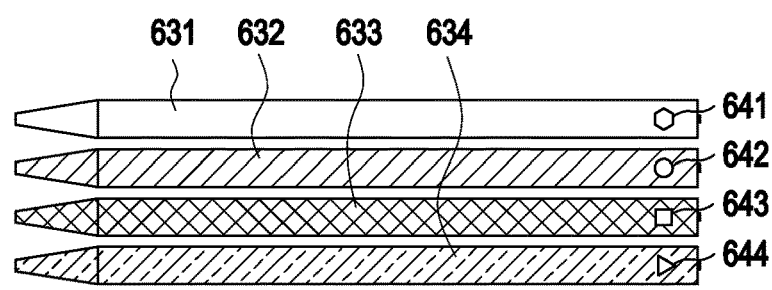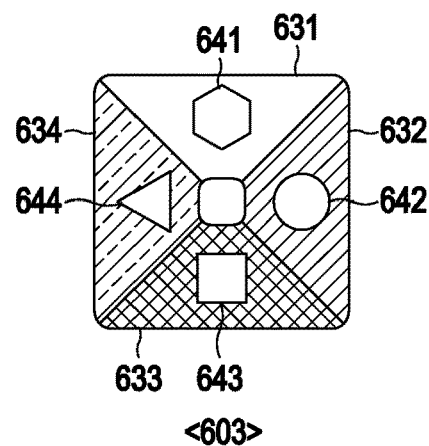
FIG.6

| Color pattern or shape pattern | 1st pattern (810) | 2nd pattern (820) | 3rd pattern (830) | 4th pattern (840) |
|---|---|---|---|---|
| Position of pen | 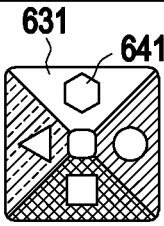 | 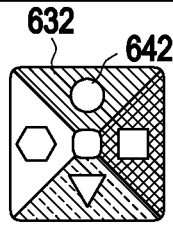 | 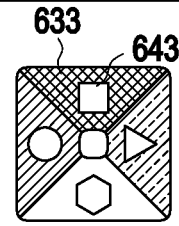 | 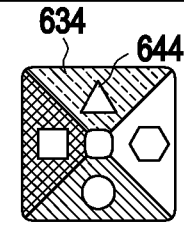 |
| Execution function | 1st specific function | 2nd specific function | 3rd specific function | 4th specific function |

FIG.8A

| Color pattern or shape pattern | 1st pattern (850) | 2nd pattern (860) | 3th pattern (870) | 4th pattern (880) |
|---|---|---|---|---|
| Position of pen | 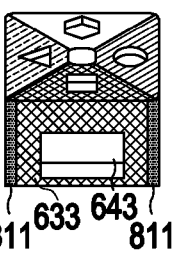 | 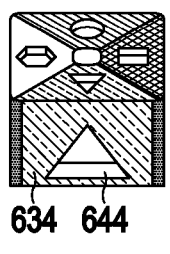 | 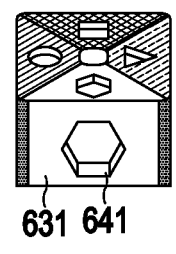 | 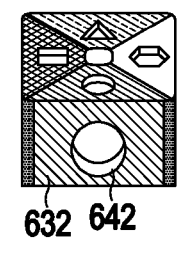 |
| Execution function | 1st specific function | 2nd specific function | 3rd specific function | 4th specific function |

FIG.8B

ELECTRONIC DEVICE FOR PERFORMING PLURALITY OF FUNCTIONS USING STYLUS PEN AND METHOD FOR OPERATING SAME

CROSS-REFERENCE TO RELATED APPLICATION(S)

This application is a continuation application, claiming priority under § 365(c), of an International application No. PCT/KR2022/003478, filed on Mar. 11, 2022, which is based on and claims the benefit of a Korean patent application number 10-2021-0113076, filed on Aug. 26, 2021, in the Korean Intellectual Property Office, the disclosure of which is incorporated by reference herein in its entirety.

TECHNICAL FIELD

The disclosure relates to a method and a device for executing a specific function of an electronic device using a color and/or a shape implemented on at least one surface of a stylus pen.

BACKGROUND

With the development of electronic and communication technologies, electronic devices may be reduced in size and weight to such an extent that the electronic devices may be used without great inconvenience even when the electronic devices are worn by a user (i.e., attached to the user's body). For example, wearable electronic devices, such as a head-mounted device (HMD), a smartwatch (or band), a contact lens-type device, a ring-type device, a glove-type device, a shoe-type device, or a clothing-type device, are commercially available. Since the wearable electronic devices are directly worn by a user, portability and user accessibility may be improved.

A head-mounted type electronic device is a device used in the state of being worn on a user's head or face and may provide augmented reality (AR) to the user. For example, a head-mounted device providing augmented reality may be implemented in the form of glasses, and may provide information about an object in the form of an image or text to the user in at least a partial space of the user's field of view.

The above information is presented as background information only to assist with an understanding of the disclosure. No determination has been made, and no assertion is made, as to whether any of the above might be applicable as prior art with regard to the disclosure.

DETAILED DESCRIPTION OF THE INVENTION

Technical Problem

In order to execute various functions in an electronic device using a stylus pen, when more than one button is implemented in the stylus pen, it may not be easy to use the stylus pen, and when functions of the electronic device are executed using a gesture for the stylus pen, handwriting input using the pen and function execution using a gesture may be confused.

Various embodiments of the disclosure are to address at least the above-mentioned problems and/or disadvantages and to provide at least the advantages described below. Various embodiments of the disclosure may provide an electronic device configured to execute a specific function using one of a color or a shape implemented on at least one surface of a stylus pen or to execute a specific function using angle information of the stylus pen and angle information of the electronic device.

Additional embodiments will be set forth in part in the description which follows and, in part, will be apparent from the description, or may be learned by practice of the presented embodiments.

Technical Solution

In accordance with various embodiments of the disclosure, an electronic device is provided. The electronic device includes a communication circuitry, a display, a camera, and a processor operatively connected to the communication circuitry, wherein the processor may be configured to detect at least one of a first specific color or a first specific shape from at least one surface of a stylus pen using the camera and to execute a first specific function based on detecting at least one of the first specific color or the first specific shape.

In accordance with various embodiments of the disclosure, a method of operating an electronic device including a communication circuitry, a display, and a camera is provided. The method includes an operation of detecting at least one of a first specific color or a first specific shape from at least one surface of a stylus pen using the camera, and an operation of executing a first specific function based on detecting the at least one of the first specific color or the first specific shape.

Advantageous Effects

According to various embodiments, by executing a specific function of an electronic device using a color and/or a shape implemented on at least one surface of a stylus pen, a user can use the electronic device quickly and conveniently.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of various embodiments of the disclosure will be more apparent from the following description taken in conjunction with the accompanying drawings, in which:

FIG. 6 illustrates a perspective view, a side view, and a rear view of a stylus pen according to various embodiments of the disclosure;

FIG. 8A illustrates various embodiments for a color pattern and a shape pattern implemented on a rear part of a stylus pen according to various embodiments of the disclosure;

FIG. 8B illustrates various embodiments for a color pattern and a shape pattern implemented on a rear part and a side part of a stylus pen according to various embodiments of the disclosure.

The same reference numerals are used to represent the same elements throughout the drawings.

MODE FOR CARRYING OUT THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
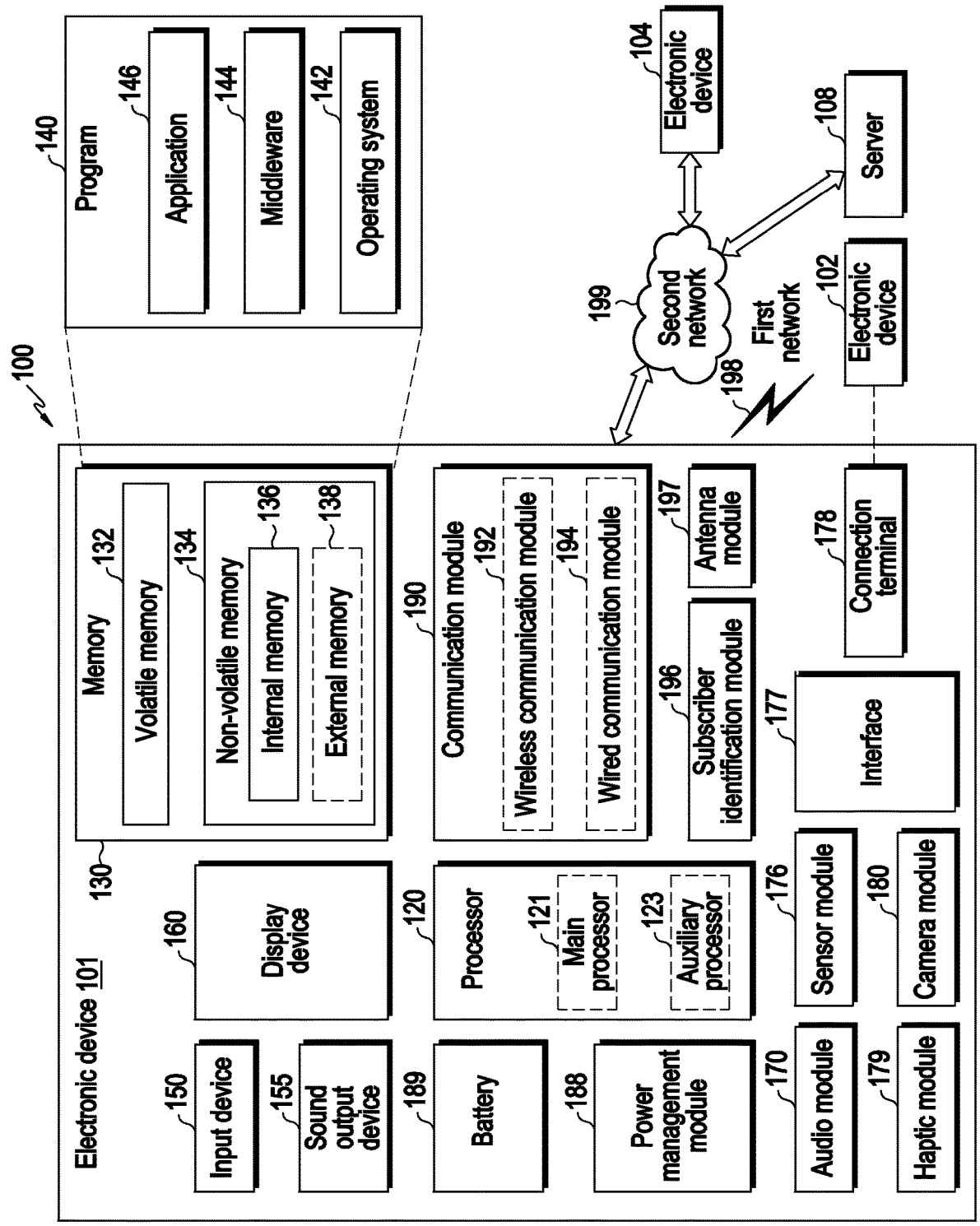
FIG. 1 is a block diagram of an electronic device in a network environment according to various embodiments of the disclosure.

FIG. 1 is a block diagram illustrating an electronic device in a network environment according to various embodiments of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to various embodiments, the electronic device 101 may communicate with the electronic device 104 via the server 108. According to various embodiments, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication circuitry 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication circuitry 190) in volatile memory 132, process the command or the data stored in the volatile memory 132, and store resulting data in non-volatile memory 134. According to various embodiments, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication circuitry 190) among the components of the electronic device 101, instead of the main processor 121 while the main processor 121 is in an inactive (e.g., sleep) state, or together with the main processor 121 while the main processor 121 is in an active (e.g., executing an application) state. According to various embodiments, the auxiliary processor 123 (e.g., an image signal processor or a communication processor) may be implemented as part of another component (e.g., the camera module 180 or the communication circuitry 190) functionally related to the auxiliary processor 123. According to various embodiments, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to various embodiments, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to various embodiments, the display module 160 may include a touch sensor adapted to detect a touch, or a pressure sensor adapted to measure the intensity of force incurred by the touch.

The audio module 170 may convert a sound into an electrical signal and vice versa. According to various embodiments, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to various embodiments, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to various embodiments, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to various embodiments, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to various embodiments, the haptic module 179 may include, for example, a motor, a piezoelectric element, or an electric stimulator.

The camera module 180 may capture a still image or moving images. According to various embodiments, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to various embodiments, the battery 189 may include, for example, a primary cell which is not rechargeable, a secondary cell which is rechargeable, or a fuel cell.

The communication circuitry 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication circuitry 190 may include one or more communication processors that are operable independently from the processor 120 (e.g., the application processor (AP)) and supports a direct (e.g., wired) communication or a wireless communication. According to various embodiments, the communication circuitry 190 may include a wireless communication circuitry 192 (e.g., a cellular communication circuitry, a short-range wireless communication circuitry, or a global navigation satellite system (GNSS) communication circuitry) or a wired communication circuitry 194 (e.g., a local area network (LAN) communication circuitry or a power line communication (PLC) module). A corresponding one of these communication circuitrys may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication circuitrys may be implemented as a single component (e.g., a single chip), or may be implemented as multi components (e.g., multi chips) separate from each other. The wireless communication circuitry 192 may identify or authenticate the electronic device 101 in a communication network, such as the first network 198 or the second network 199, using subscriber information (e.g., international mobile subscriber identity (IMSI)) stored in the subscriber identification module 196.

The wireless communication circuitry 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication circuitry 192 may support a high-frequency band (e.g., the mmWave band) to achieve, e.g., a high data transmission rate. The wireless communication circuitry 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication circuitry 192 may support various requirements specified in the electronic device 101, an external electronic device (e.g., the electronic device 104), or a network system (e.g., the second network 199). According to various embodiments, the wireless communication circuitry 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to various embodiments, the antenna module 197 may include an antenna including a radiating element composed of a conductive material or a conductive pattern formed in or on a substrate (e.g., a printed circuit board (PCB)). According to various embodiments, the antenna module 197 may include a plurality of antennas (e.g., array antennas). In such a case, at least one antenna appropriate for a communication scheme used in the communication network, such as the first network 198 or the second network 199, may be selected, for example, by the communication circuitry 190 from the plurality of antennas. The signal or the power may then be transmitted or received between the communication circuitry 190 and the external electronic device via the selected at least one antenna. According to various embodiments, another component (e.g., a radio frequency integrated circuit (RFIC)) other than the radiating element may be additionally formed as part of the antenna module 197.

According to various embodiments, the antenna module 197 may form a mmWave antenna module. According to various embodiments, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to various embodiments, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to various embodiments, all or some of operations to be executed at the electronic device 101 may be executed at one or more of the external electronic devices 102 or 104, or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to various embodiments, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to various embodiments of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to various embodiments, the module may be implemented in a form of an application-specific integrated circuit (ASIC).

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
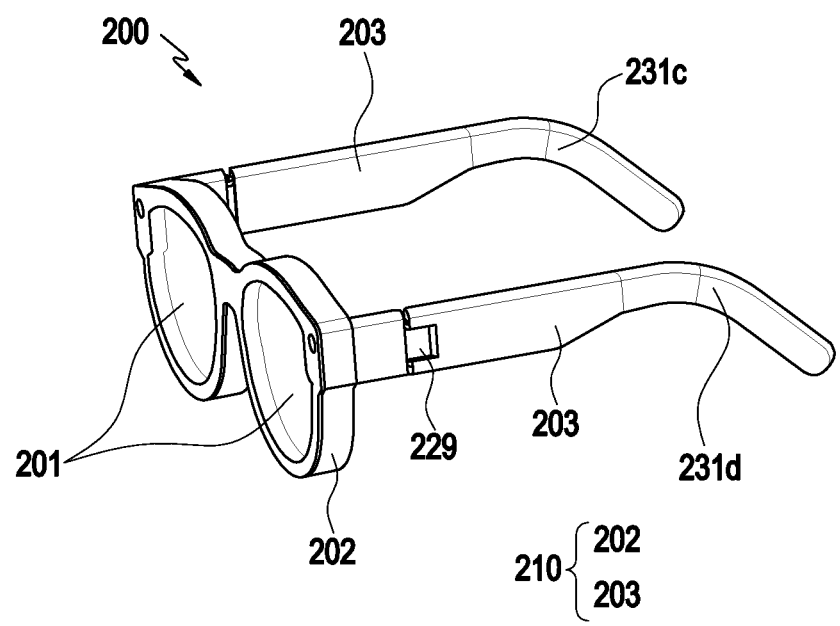
FIG. 2 is a perspective view illustrating an electronic device according to various embodiments of the disclosure.

FIG. 2 is a perspective view illustrating an electronic device according to various embodiments of the disclosure.

Referring to FIG. 2, an electronic device 200 is a wearable electronic device in the form of glasses, and a user may visually recognize a surrounding object or environment in the state of wearing the electronic device 200. For example, the electronic device 200 may be a head mounted device (HMD) or smart glasses capable of providing an image directly in front of the user's eyes. The configuration of the electronic device 200 of FIG. 2 may be all or partly the same as that of the electronic device 101 of FIG. 1.

According to various embodiments, the electronic device 200 may include a housing 210 that defines an exterior of the electronic device 200. The housing 210 may provide a space in which components of the electronic device 200 may be disposed. For example, the housing 210 may include a lens frame 202 and at least one wearing member 203.

According to various embodiments, the electronic device 200 may include at least one display member 201 capable of providing visual information to the user. For example, the display member 201 may include a module equipped with a lens, a display, a waveguide, and/or a touch circuit. According to various embodiments, the display member 201 may be transparent or translucent. According to various embodiments, the display member 201 may include a translucent glass or a window member capable of adjusting the transmittance of light by adjusting the color concentration thereof. According to various embodiments, a pair of display members 201 may be provided and may be disposed to correspond to the left eye and the right eye of the user, respectively, in the state in which the electronic device 200 is worn on the user's body.

According to various embodiments, the lens frame 202 may accommodate at least a part of the display members 201. For example, the lens frame 202 may surround at least a part of the edges of the display members 201. According to various embodiments, the lens frame 202 may position at least one of the display members 201 to correspond to the user's eyes. According to various embodiments, the lens frame 202 may be a rim having a general eyeglass structure. According to various embodiments, the lens frame 202 may include at least one closed curve surrounding the display members 201.

According to various embodiments, the wearing member 203 may extend from the lens frame 202. For example, the wearing member 203 may extend from respective ends of the lens frame 202 and may be supported or located on the user's body (e.g., ears) together with the lens frame 202. According to various embodiments, the wearing member 203 may be rotatably coupled to the lens frame 202 through a hinge structure 229. According to various embodiments, the wearing member 203 may include inner surfaces 231c configured to face the user's body and outer surfaces 231d opposite to the inner surfaces.

According to various embodiments, the electronic device 200 may include a hinge structure 229 configured to enable the wearing member 203 to be folded with respect to the lens frame 202. The hinge structure 229 may be disposed between the lens frame 202 and the wearing member 203. In the state in which the electronic device 200 is not worn, the user may carry or store the electronic device 200 in the state in which the wearing member 203 is folded to partially overlap the lens frame 202.

Figure 3:
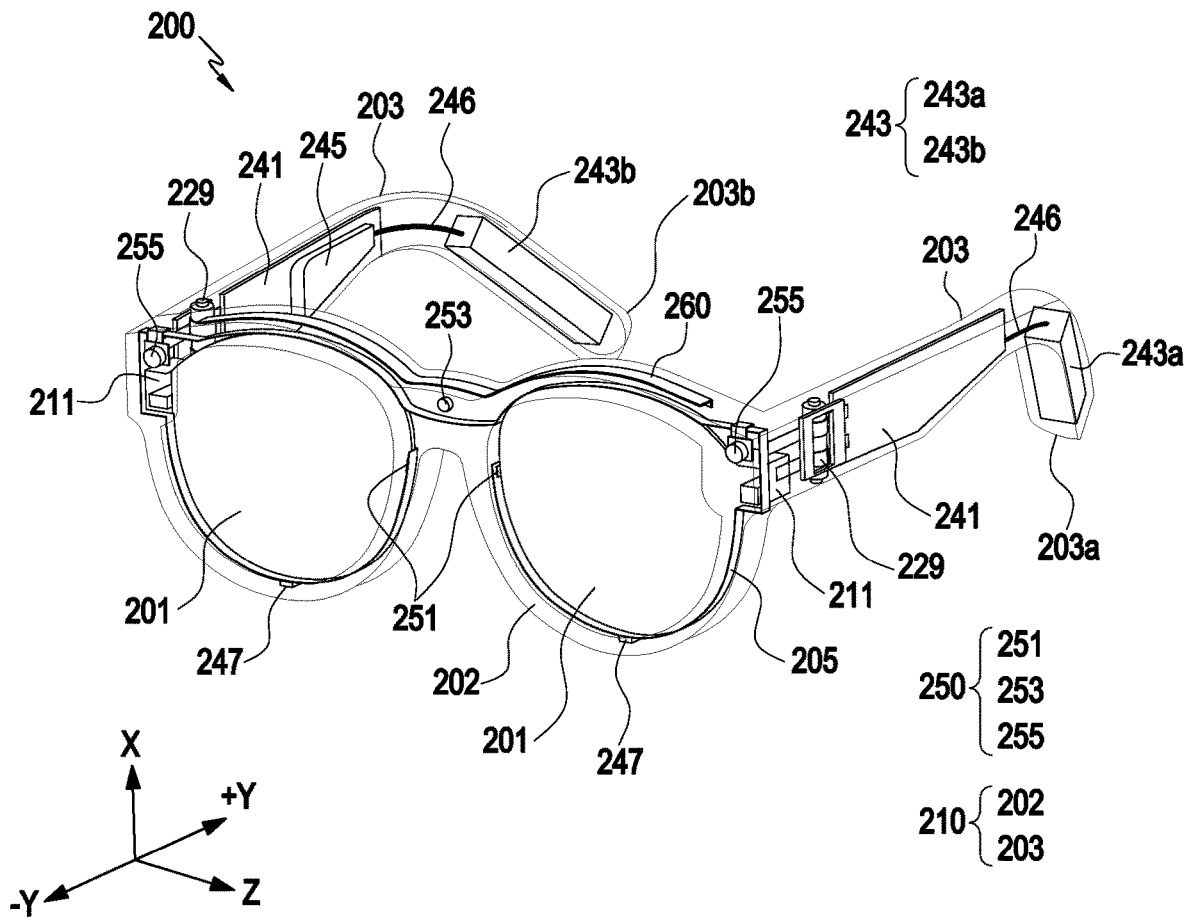
FIG. 3 is a perspective view for describing an internal configuration of an electronic device according to various embodiments of the disclosure.

FIG. 3 is a perspective view for describing an internal configuration of an electronic device according to various embodiments of the disclosure.

Figure 4:
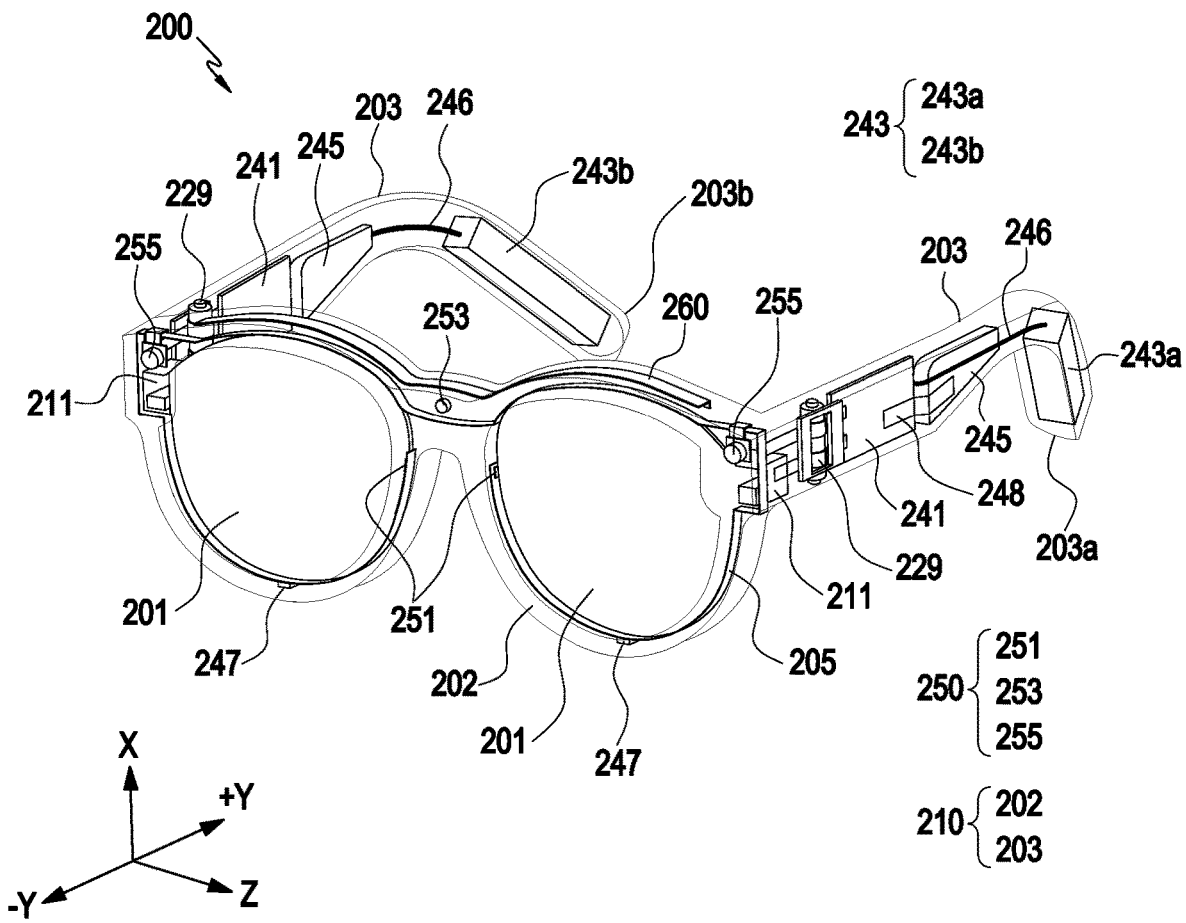
FIG. 4 is a perspective view for describing an internal configuration of an electronic device according to various embodiments of the disclosure.

FIG. 4 is a perspective view for describing an internal configuration of an electronic device according to various embodiments of the disclosure.

Figure 5:
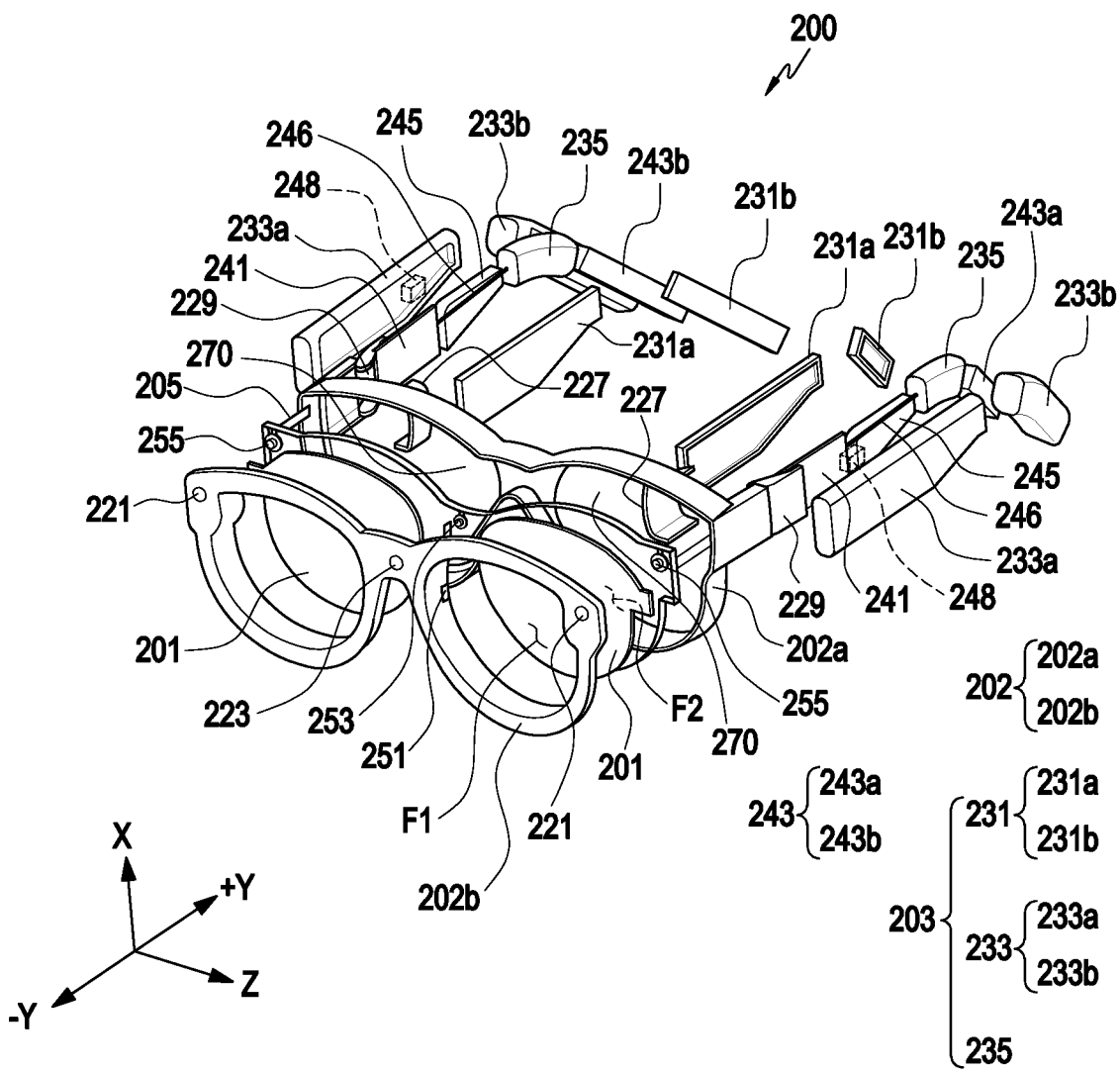
FIG. 5 is an exploded perspective view illustrating an electronic device according to various embodiments of the disclosure.

FIG. 5 is an exploded perspective view illustrating an electronic device according to various embodiments of the disclosure.

Referring to FIGS. 3 to 5, the electronic device 200 may include components (e.g., at least one circuit board 241 (e.g., a printed circuit board (PCB), a printed board assembly (PBA)), a flexible PCB (FPCB), or a rigid-flex PCB (RFPCB)), at least one battery 243, at least one speaker module 245, at least one power transmission structure 246, and a camera module 250) accommodated in the housing 210. The configuration of the housing 210 of FIGS. 3 and 4 may be all or partly the same as the configuration of the display member 201, the lens frame 202, the wearing member 203, and the hinge structure 229 of FIG. 2.

According to various embodiments, the electronic device 200 may acquire and/or recognize visual images regarding an object or environment in a direction, in which the user gazes or the electronic device 200 is oriented (e.g., −Y direction), using a camera module 250 (e.g., the camera module 180 of FIG. 1) and may receive information about an object or environment from an external electronic device (e.g., the electronic devices 102 and 104 or the server 108 in FIG. 1) via a network (e.g., the first network 198 or the second network 199 in FIG. 1). In another embodiment, the electronic device 200 may provide the received information about the object or environment to the user in an acoustic or visual form. The electronic device 200 may provide the received information about the object or environment to the user through the display member 201 in a visual form using a display module (e.g., the display module 160 in FIG. 1). For example, the electronic device 200 may implement augmented reality by implementing the information about an object or environment in a visual form and combining the information with an actual image of the environment around the user.

According to various embodiments of the disclosure, the display member 201 may include a first surface F1 oriented in a direction (e.g., in the −Y direction) in which external light is incident and a second surface F2 facing away from the first surface F1 (e.g., in the +Y direction). In the state in which the user wears the electronic device 200, at least a part of the light or image incident through the first surface F1 may pass through the second surface F2 of the display members 201, which is disposed to face the user's left eye and/or right eye to be incident to the user's left eye and/or right eye.

According to various embodiments, the lens frame 202 may include at least two frames. For example, the lens frame 202 may include a first frame 202a and a second frame 202b. According to various embodiments, when the user wears the electronic device 200, the first frame 202a may be a frame of a portion facing the user's face, and the second frame 202b may be a part of the lens frame 202 spaced apart from the first frame 202a in the user's gazing direction (e.g., −Y direction).

According to various embodiments, a light output module 211 may provide an image and/or a picture to the user. For example, the light output module 211 may include a display panel (not illustrated) capable of outputting an image, and a lens (not illustrated) corresponding to the user's eyes and is configured to guide the image to the corresponding display member 201. For example, the user may acquire an image output from the display panel of the light output module 211 through the lens of the light output module 211. According to various embodiments, each light output module 211 may include a device configured to display various pieces of information. For example, the light output module 211 may include at least one of a liquid crystal display (LCD), a digital mirror device (DMD), a liquid crystal-on-silicon (LCoS) device, or an organic light emitting diode, or an organic light-emitting diode (OLED), or a micro light emitting diode (a micro-LED). According to various embodiments, when the light output module 211 and/or the display member 201 include one of a liquid crystal display device, a digital mirror display device, or a silicon liquid crystal display device, the electronic device 200 may include a light source that emits light to a display area of the light output module 211 and/or the display member 201. According to another embodiment, when the light output module 211 and/or the display member 201 include one of an organic light emitting diode or a micro-LED, the electronic device 200 may provide a virtual image to the user without including a separate light source.

According to various embodiments, at least a part of the light output module 211 may be disposed in the housing 210. For example, the light output modules 211 may be disposed on the wearing member 203 or the lens frame 202 to correspond to the user's right eye and left eye, respectively. According to various embodiments, the light output module 211 may be connected to the display member 201 and may provide an image to the user through the display member 201. For example, an image output from the light output module 211 may be incident on the display member 201 via an input optical member located at one end of the display member 201, and may be emitted to the user's eyes through a waveguide and an output optical member located in at least a part of the display member 201. According to various embodiments, the waveguide may be made of glass, plastic, or polymer, and may include a nano-pattern formed on one inner or outer surface, for example, a grating structure of a polygonal or curved shape. According to various embodiments, the waveguide may include at least one of at least one diffractive element (e.g., a diffractive optical element (DOE) or a holographic optical element (HOE)) or a reflective element (e.g., a reflective mirror).

According to various embodiments, the circuit board 241 may include components for driving the electronic device 200. For example, the circuit board 241 may include at least one integrated circuit chip, and at least one of the processor 120, the memory 130, the power management module 188, or the communication circuitry 190 of FIG. 1 may be provided in the integrated circuit chip. According to various embodiments, the circuit board 241 may be disposed inside each wearing member 203 of the housing 210. According to various embodiments, the circuit board 241 may be electrically connected to the battery 243 via a power transmission structure 246. According to various embodiments, the circuit board 241 may be connected to a flexible printed circuit board 205 and may transmit electric signals to electronic components (e.g., the light output modules 211, the camera module 250, and a light emitter (e.g., the light emitter illustrated in FIG. 5)) of the electronic device via the flexible printed circuit board 205. According to various embodiments, the circuit board 241 may be an interposer board.

According to various embodiments, the flexible printed circuit board 205 may extend from the circuit board 241 across a hinge structure 229 into the inside of the lens frame 202 and may be disposed in at least a part around the display member 201 in the inside of the lens frame 202.

According to various embodiments, the battery 243 (e.g., the battery 189 in FIG. 1) may be electrically connected to the components (e.g., the light output module 211, the circuit board 241, the speaker module 245, the microphone module 247, and/or the camera module 250) of the electronic device 200, and may supply power to the components of the electronic device 200.

According to various embodiments, at least a part of the battery 243 may be disposed on the wearing member 203. According to various embodiments, the battery 243 may be disposed adjacent to the end 203a or 203b of the wearing member 203. For example, the battery 243 may include a first battery 243a disposed at the first end 203a of the wearing member 203 and a second battery 243b disposed at the second end 203b of the wearing member 203.

According to various embodiments, the speaker module 245 (e.g., the audio module 170 or the sound output module 155 in FIG. 1) may convert an electrical signal into sound. At least a part of the speaker module 245 may be disposed inside the wearing member 203 of the housing 210. According to various embodiments, the speaker module 245 may be located inside the wearing member 203 to correspond to a user's ear. According to various embodiments (e.g., FIG. 3), the speaker module 245 may be disposed on the circuit board 241. For example, the speaker module 245 may be disposed between the circuit board 241 and inner case (e.g., the inner case 231 in FIG. 5). According to various embodiments (e.g., FIG. 4), the speaker module 245 may be disposed next to the circuit board 241. For example, the speaker module 245 may be disposed between the circuit board 241 and the battery 243.

According to various embodiments, the electronic device 200 may include a connection member 248 that is connected to the speaker module 245 and the circuit board 241. The connection member 248 may transmit at least a part of the sound and/or vibration generated by the speaker module 245 to the circuit board 241. According to various embodiments, the connection member 248 may be integrally formed with the speaker module 245. For example, a portion extending from a speaker frame of the speaker module 245 may be interpreted as a connection member 248. According to various embodiments (e.g., FIG. 3), the connection member 248 may be omitted. For example, when the speaker module 245 is disposed on the circuit board 241, the connection member 248 may be omitted.

According to various embodiments, the power transmission structure 246 may transmit power from the battery 243 to an electronic component (e.g., the light output module 211) of the electronic device 200. For example, the power transmission structure 246 may be electrically connected to the battery 243 and/or the circuit board 241, and the circuit board 241 may transmit, to the light output module 211, power received through the power transmission structure 246.

According to various embodiments, the power transmission structure 246 may be a configuration capable of transmitting power. For example, the power transmission structure 246 may include a flexible printed circuit board or wire. For example, the wire may include a plurality of cables (not illustrated). In various embodiments, the shape of the power transmission structure 246 may be variously modified in consideration of the number and/or type of cables.

According to various embodiments, a microphone module 247 (e.g., the input module 150 and/or the audio module 170 of FIG. 1) may convert sound into an electrical signal. According to various embodiments, a microphone module 247 may be disposed on at least a part of the lens frame 202. For example, at least one microphone module 247 may be disposed at the lower end (e.g., in the direction oriented in the –X axis) and/or at the upper end (e.g., in the direction oriented in the X axis) of the electronic device 200. According to various embodiments, the electronic device 200 may more clearly recognize the user's voice using voice information (e.g., sound) acquired from the at least one microphone module 247. For example, on the basis of the acquired voice information and/or additional information (e.g., low-frequency vibration of the user's skin and bone), the electronic device 200 may distinguish voice information and ambient noise from each other. For example, the electronic device 200 may clearly recognize the user's voice and may perform a function of reducing ambient noise (e.g., noise canceling).

According to various embodiments, the camera module 250 may photograph a still image and/or a moving image. The camera module 250 may include at least one of a lens, at least one image sensor, an image signal processor, or a flash. According to various embodiments, the camera module 250 may be disposed in the lens frame 202 and disposed around the display member 201.

According to various embodiments, the camera module 250 may include at least one first camera module 251. According to various embodiments, the first camera module 251 may photograph the trajectory of the user's eyes (e.g., pupils) or gaze. For example, the first camera module 251 may photograph a reflection pattern of light emitted by a light emitter (e.g., the light emitter 330 in FIG. 5) to the user's eyes. For example, the light emitter 330 may emit light in an infrared band for tracking the trajectory of the gaze using the first camera module 251. For example, the light emitter 330 may include an IR LED. According to various embodiments, in order to make a virtual image projected to the display member 201 correspond to the direction at which the user's pupils gaze, the processor (e.g., the processor 120 in FIG. 1) may adjust the position of the virtual image. According to various embodiments, the first camera module 251 may include a global shutter (GS) type camera, and may track the trajectory of the user's eyes or gaze using a plurality of first camera modules 251 having the same standard and performance.

According to various embodiments, the first camera module 251 may periodically or aperiodically transmit information related to the trajectory of the user's eyes or gaze (e.g., trajectory information) to a processor (e.g., the processor 120 in FIG. 1). According to another embodiment, the first camera module 251 may transmit the trajectory information to the processor when detecting that the user's gaze has changed based on the trajectory information (e.g., the eyes move more than a reference value in the state in which the head is not moving).

According to various embodiments, the camera module 250 may include a second camera module 253. According to various embodiments, the second camera module 253 may capture an external image. According to various embodiments, the second camera module 253 may be a global shutter type or a rolling shutter (RS) type camera. According to various embodiments, the second camera module 253 may capture an external image through a second optical hole 223 provided in the second frame 202b. For example, the second camera module 253 may include a high-resolution color camera and may be a high-resolution (HR) or photo-video (PV) camera. In addition, the second camera module 253 may provide an auto focus (AF) function and an optical image stabilizer (OIS) function.

According to various embodiments (not illustrated), the electronic device 200 may include a flash (not illustrated) located adjacent to the second camera module 253. For example, the flash (not illustrated) may provide light for increasing the brightness (e.g., illuminance) around the electronic device 200 when acquiring an external image of the second camera module 253, and may reduce difficulty of acquiring an image due to a dark environment, mixing of various light sources, and/or reflection of light.

According to various embodiments, the camera module 250 may include at least one third camera module 255. According to various embodiments, the third camera module 255 may photograph a user's motion through the first optical hole 221 provided in the lens frame 202. For example, the third camera module 255 may photograph the user's gesture (e.g., a hand gesture). The third camera module 255 and/or first optical hole 221 may be disposed at each of the opposite ends of the lens frame 202 (e.g., the second frame 202b) (e.g., the opposite ends of the lens frame 202 (e.g., the second frame 202b) in the X direction). According to various embodiments, the third camera module 255 may be a global shutter (GS) type camera. For example, the third camera module 255 may provide 360-degree spatial (e.g., omnidirectional), positional, and/or movement recognition using a camera that supports 3 degrees of freedom (DoF) or 6 DoF. According to various embodiments, the third camera module 255 may perform a movement path tracking function (simultaneous localization and mapping (SLAM)) and a user movement recognition function using a plurality of global shutter-type cameras of the same standard and performance as stereo cameras. According to various embodiments, the third camera module 255 may include an infrared (IR) camera (e.g., a time of flight (ToF) camera or a structured light camera). For example, the IR camera may be operated as at least a part of a sensor module (e.g., the sensor module 176 in FIG. 1) for detecting a distance to a subject.

According to various embodiments, at least one of the first camera module 251 and the third camera module 255 may be replaced with a sensor module (e.g., the sensor module 176 in FIG. 1). For example, the sensor module may include at least one of a vertical cavity surface emitting laser (VCSEL), an infrared sensor, and/or a photodiode. For example, the photodiode may include a positive intrinsic negative (PIN) photodiode or an avalanche photodiode (APD). The photodiode may be referred to as a photo detector or a photo sensor.

According to various embodiments, at least one of the first camera module 251, the second camera module 253, and the third camera module 255 may include a plurality of camera modules (not illustrated). For example, the second camera module 253 may include a plurality of lenses (e.g., wide-angle and telephoto lenses) and image sensors and may be disposed on one side (e.g., a surface oriented in the −Y axis) of the electronic device 200. For example, the electronic device 200 may include a plurality of camera modules having different attributes (e.g., angles of view) or functions, respectively, and may control the camera modules to change the angles of view of thereof based on the user's selection and/or trajectory information. For example, at least one of the plurality of camera modules may be a wide-angle camera, and at least one of other camera modules may be a telephoto camera.

According to various embodiments, the processor (e.g., the processor 120 of FIG. 1) may determine the movement of the electronic device 300 and/or the user's movement using the information of the electronic device 200 acquired using at least one of the gesture sensor, the gyro sensor, or the acceleration sensor of the sensor module (e.g., the sensor module 176 in FIG. 1) and the user's movement (e.g., the approach of the user's body to the electronic device 200) acquired using the third camera module 255. According to various embodiments, in addition to the above-described sensors, the electronic device 200 may include a magnetic (geomagnetic) sensor capable of measuring an orientation using a magnetic field and a magnetic field line and/or a Hall sensor capable of acquiring movement information (e.g., a movement direction or a movement distance). For example, the processor may determine the movement of the electronic device 200 and/or the movement of the user based on information acquired from the magnetic (geomagnetic) sensor and/or the Hall sensor.

According to various embodiments (not illustrated), the electronic device 200 may perform an input function (e.g., a touch and/or a pressure detection function) capable of interacting with the user. For example, components configured to perform a touch and/or a pressure detection function (e.g., a touch sensor and/or a pressure sensor) may be disposed on at least a part of the wearing member 203. The electronic device 200 may control the virtual image output through the display member 201 based on the information acquired through the components. For example, the sensors related to a touch and/or a pressure detection function may be configured in various types, such as a resistive type, a capacitive type, an electro-magnetic type (EM), or an optical type. According to various embodiments, the components configured to perform a touch and/or a pressure detection function may be all or partly the same as the configuration of the input module 150 of FIG. 1.

According to various embodiments, the electronic device 200 may include a reinforcing member 260 disposed in the internal space of the lens frame 202 and configured to have a higher rigidity than that of the lens frame 202.

According to various embodiments, the electronic device 200 may include a lens structure 270. The lens structure 270 may refract at least a part of light. For example, the lens structure 270 may be a prescription lens having a specified refractive power. According to various embodiments, the housing 210 may include a hinge cover 227 that is capable of concealing a part of the hinge structure 229. Another portion of the hinge structure 229 may be accommodated or concealed between the inner case 231 and the outer case 233 to be described later.

According to various embodiments, the wearing member 203 may include an inner case 231 and an outer case 233. The inner case 231 is, for example, a case configured to face the user's body or come into direct contact with the user's body, and may be made of a material having a low thermal conductivity (e.g., a synthetic resin). According to various embodiments, the inner case 231 may include an inner surface (e.g., the inner surface 231c in FIG. 2) facing the user's body. The outer case 233 may include, for example, a material (e.g., a metal material) capable of at least partially transferring heat, and may be coupled to face the inner case 231. According to various embodiments, the outer case 233 may include an outer surface (e.g., the outer surfaces 231d of FIG. 2) opposite to the inner surface 231c. In various embodiments, at least one of the circuit board 241 or the speaker module 245 may be accommodated in a space separated from the battery 243 within the wearing member 203. In the illustrated embodiment, the inner case 231 may include a first case 231a including a circuit board 241 and/or a speaker module 245 and a second case 231b configured to accommodate the battery 243, and the outer case 233 may include a third case 233a coupled to face the first case 231a and a fourth case 233b coupled to face the second case 231b. For example, the first case 231a and the third case 233a (hereinafter, "first case parts 231a and 233a") may be coupled to accommodate the circuit board 241 and/or the speaker module 245, and the second case 231b and the fourth case 233b (hereinafter, "second case parts 231b and 233b") may be coupled to accommodate the battery 243.

According to various embodiments, the first case parts 231a and 233a may be rotatably coupled to the lens frame 202 via the hinge structures 229, and the second case parts 231b and 233b may be connected to or mounted on the ends of the first case parts 231a and 233a via the connection structures 235. In some embodiments, the portions of the connection structures 235 that come into contact with the user's body may be made of a material having low thermal conductivity (e.g., an elastic material such as silicone, polyurethane, or rubber), and the portions that do not come into contact with the user's body may be made of a material having a high thermal conductivity (e.g., a metal material). For example, when heat is generated from the circuit boards 241 or the batteries 243, the connection structures 235 block heat from being transferred to portions that come into contact with the user's body, and may disperse or release heat through the portions that are not come into contact with the user's body. According to various embodiments, the portions of the connection structures 235 that are configured to come into contact with the user's body may be interpreted as portions of the inner cases 231, and the portions of the connection structures 235 that do not come into contact with the user's body may be interpreted as portions of the outer cases 233. According to various embodiments (not illustrated), the first case 231a and the second case 231b may be integrally configured without the connection structure 235, and the third case 233a and the fourth case 233b may be integrally configured to each other without the connection structure 235. According to various embodiments, in addition to the illustrated components, other components (e.g., the antenna module 197 of FIG. 1) may be further included, and by using the communication circuitry 190, information about an object or environment may be received from an external electronic device (e.g., the electronic device 102 or 104 or the server 108 in FIG. 1) using a communication circuitry 190 via a network (e.g., the first network 198 or the second network 199 in FIG. 1).

FIG. 6 illustrates a perspective view, a side view, and a rear view of a stylus pen 600 according to various embodiments of the disclosure.

According to various embodiments, a rear part 610 of a stylus pen 600 may be formed in a polygonal shape, the front part 620 may be formed in a polygonal pyramid shape, and a side part 630 may have surfaces the number of which corresponds to the polygonal shape of the rear part 610. For example, referring to <601> in FIG. 6, the rear part 610 of the stylus pen 600 may have a quadrangular shape, the front part 620 may have a quadrangular pyramid shape, and the side part 630 may have four surfaces corresponding to the quadrangular shape of the rear part 610.

According to various embodiments, the respective surfaces of the side part 630 of the stylus pen 600 may be distinguished by different colors and/or different shapes. For example, referring to <602> in FIG. 6, a first side surface of the stylus pen 600 may be implemented as a first color 631 (e.g., white), a second side surface may be implemented as a second color 632 (e.g., red), a third side surface may be implemented as a third color 633 (e.g., blue), and a fourth side surface may be implemented as a fourth color 634 (e.g., black). As another example, referring to <602> in FIG. 6, a first shape 641 (e.g., a hexagon) may be implemented on the first side surface of the stylus pen 600, a second shape 642 (e.g., a circle) may be implemented on the second side surface of the stylus pen 600, a third shape 643 (e.g., a quadrangle) may be implemented on the third side surface, and a fourth shape 644 (e.g., a triangle) may be implemented on the fourth side surface.

According to various embodiments, respective portions of the rear part 610 of the stylus pen 600 may be distinguished by at least two colors and/or at least two shapes. For example, referring to <603> in FIG. 6, respective portions of the rear part 610 of the stylus pen 600 may be distinguished by a first color 631 (e.g., white), a second color 632 (e.g., red), a third color 633 (e.g., blue), and a fourth color 634 (e.g., black) to correspond to the respective colors of the side part 630. As another example, referring to <603> in FIG. 6, respective portions of the rear part 610 of the stylus pen 600 may be distinguished by a first shape 641 (e.g., a hexagon), a second shape 642 (e.g., a circle), a third shape 643 (e.g., a quadrangle), and a fourth shape 644 (e.g., a triangle) to correspond to respective shapes implemented in the side part 630. According to various embodiments, respective colors and respective shapes implemented in the rear part 610 and the side part 630 of the stylus pen 600 may be associated with each other, and the respective shapes implemented in the rear part 610 and the side part 630 of the stylus pen 600 may be implemented through engraving or embossing.

Figure 7:
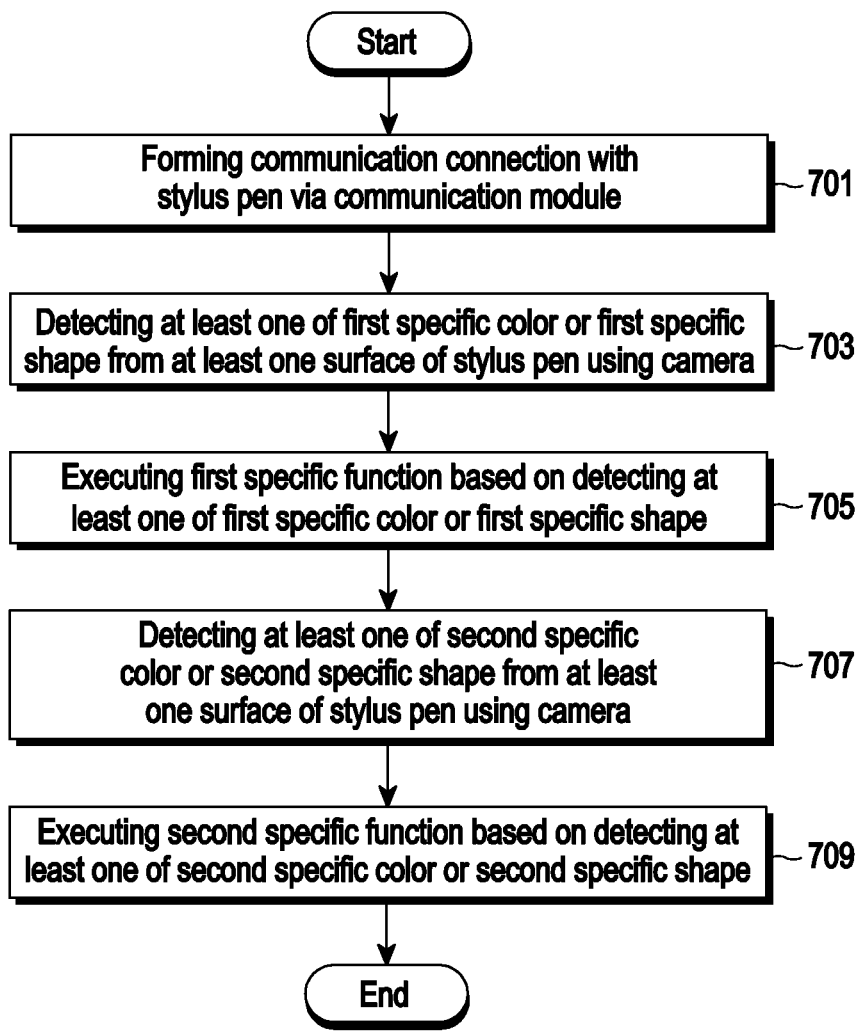
FIG. 7 is a flowchart for describing an operation of executing a plurality of functions of an electronic device using pattern information detected by the electronic device from a stylus pen according to various embodiments of the disclosure.

FIG. 7 is a flowchart for describing an operation for executing a plurality of functions of an electronic device (101) using pattern information detected by the electronic device from a stylus pen (e.g., the stylus pen 600 in FIG. 6) according to various embodiments of the disclosure.

FIG. 8A illustrates various embodiments for color patterns and shape patterns implemented on a rear part (e.g., the rear part 610 in FIG. 6) of a stylus pen according to various embodiments of the disclosure.

FIG. 8B illustrates various embodiments for color patterns and shape patterns implemented together on a rear part (e.g., the rear part 610 in FIG. 6) and a side part (e.g., the side part 630 in FIG. 6) of a stylus pen according to various embodiments of the disclosure.

In operation 701, according to various embodiments, the electronic device 101 (e.g., the processor 120 in FIG. 1) is a wearable electronic device in the form of glasses, and may establish a communication connection with the stylus pen 600 via a communication circuitry (e.g., the communication circuitry 190 in FIG. 1). For example, the electronic device 101 may establish a communication connection with the stylus pen 600 via a Bluetooth communication circuitry.

According to various embodiments, the electronic device 101 may acquire, in real time, angle information regarding the posture state of the stylus pen 600 from the stylus pen 600 via the communication circuitry 190. For example, the stylus pen 600 may detect angle information thereof using a sensor module (e.g., an acceleration sensor and/or a gyro sensor) provided therein, and may transmit the detected angle information to the electronic device 101.

According to various embodiments, when the electronic device 101 is a wearable electronic device (e.g., AR glasses), the electronic device (e.g., the processor 120 in FIG. 1) may establish a first communication connection (e.g., a Bluetooth communication connection) with the stylus pen 600 and may establish a second communication connection (e.g., a Wi-Fi communication connection) with an external electronic device (e.g., the electronic device 102 in FIG. 2) (e.g., a smartphone).

In operation 703, according to various embodiments, the electronic device 101 (e.g., the processor 120 in FIG. 1) may detect at least one of a first specific color or a first specific shape from at least one surface of the stylus pen 600 using a camera (e.g., the camera module 180 in FIG. 1).

According to various embodiments, the electronic device 101 may process simultaneous localization and mapping (SLAM) data using the camera module 180. The SLAM may mean an operation of creating a map of the surrounding environment of the electronic device 101 using a sensor module (e.g., the sensor module 176 in FIG. 1) attached to the electronic device 101.

According to various embodiments, while the user uses the stylus pen 600, the electronic device 101 may detect at least one of the color patterns or the shape patterns implemented in the rear part 610 of the stylus pen 600 using the camera module 180. For example, referring to FIG. 8A, the electronic device 101 may recognize the rear part 610 of the stylus pen 600 using the camera module 180, and may detect a first pattern 810 as the color pattern in which the first color 631 of the rear part 610 is directed upward, the second color 632 is directed rightward, the third color 633 is directed downward, and the fourth color 634 is directed leftward. As another example, referring to FIG. 8A, the electronic device 101 may recognize the rear part 610 of the stylus pen 600 using the camera module 180, and may detect a first pattern 810 as the shape pattern in which the first shape 641 of the rear part 610 is directed upward, the second shape 642 is directed rightward, the third shape 643 is directed downward, and the fourth shape 644 is directed leftward. As another example, referring to FIG. 8A, whenever the stylus pen 600 rotates counterclockwise, the electronic device 101 may detect each of a second pattern 820, a third pattern 830, and a fourth pattern 840 as a color pattern from the rear part 610 using the camera module 180, or may detect each of a second pattern 820, a third pattern 830, and a fourth pattern 840 as a shape pattern from the rear part 610.

According to various embodiments, while the user uses the stylus pen 600, the electronic device 101 may detect at least one of the color patterns or the shape patterns implemented in the side part 630 of the stylus pen 600 using the camera module 180. For example, referring to FIG. 8B, the electronic device 101 may recognize the side part 630 of the stylus pen 600 using the camera module 180, and may detect the first pattern 850 as the color pattern in which the third color 633 of the side part 630 is directed downward. For example, referring to FIG. 8B, the electronic device 101 may recognize the side part 630 of the stylus pen 600 using the camera module 180, and may detect the first pattern 850 as the color pattern in which the third shape 643 of the side part 630 is directed downward. As another example, referring to FIG. 8B, whenever the stylus pen 600 rotates counterclockwise, the electronic device 101 may detect each of a second pattern 860, a third pattern 870, and a fourth pattern 880 as a color pattern from the side part 630 using the camera module 180, or may detect each of a second pattern 860, a third pattern 870, and a fourth pattern 880 as a shape pattern from the side part 630.

In operation 705, according to various embodiments, the electronic device 101 (e.g., the processor 120 in FIG. 1) may execute a first specific function based on detecting at least one of the first specific color or the first specific shape.

According to various embodiments, based on detecting a first pattern corresponding to at least one of the first specific color or the first specific shape, the electronic device 101 (e.g., the processor 120 of FIG. 1) may execute the first specific function corresponding to the first pattern. According to various embodiments, based on detecting the first pattern corresponding to at least one of the color patterns or the shape patterns implemented in the rear part 610 and/or the side part 630 of the stylus pen 600, the electronic device 101 may execute the first specific function corresponding to the first pattern. For example, referring to FIGS. 8A and 8B, based on detecting the first pattern 810 and/or 850 (e.g., the first color pattern and/or the first shape pattern) from at least one surface of the stylus pen 600, the electronic device 101 may execute the first specific function corresponding to the first pattern 810 and/or 850. According to various embodiments, each specific function may be preset for at least one of each color or each shape. According to various embodiments, each specific function may be preset by a user or a manufacturer of the electronic device 101. According to various embodiments, each specific function may exhibit a function of displaying a color corresponding to a specific direction in each pattern on the display (e.g., the display module 160 in FIG. 1). For example, referring to FIGS. 8A and 8B, when the first pattern 810 and/or 850 is detected, the electronic device 101 may display, on the display module 160, a trace having a color (e.g., white) corresponding to a specific direction (e.g., upper side) in the first pattern 810 and/or 850 to correspond to the trace of the stylus pen 600.

According to various embodiments, the electronic device 101 (e.g., the processor 120 in FIG. 1) may execute a first specific function using position information of the tip of the stylus pen 600. According to various embodiments, the electronic device 101 may calculate the position information of the tip of the stylus pen 600 with respect to the display (e.g., the display module 160 in FIG. 1) of the electronic device 101 using first data regarding a distance from the tip of the stylus pen 600 to the rear part 610 of the stylus pen 600, second data regarding a difference between angle information of the stylus pen 600 and angle information of the electronic device 101, third data regarding the SLAM data of the electronic device 101, and/or fourth data regarding a distance from the electronic device 101 to the rear part 610 of the stylus pen 600, and may execute a first specific function using the calculated position information of the tip of the stylus pen 600.

According to various embodiments, in the case in which the electronic device 101 (e.g., the processor 120 of FIG. 1) is a wearable electronic device, based on detecting the first pattern corresponding to at least one of the first specific color or the first specific shape from the stylus pen 600, the electronic device 101 may transmit a command to an external electronic device 102, which is forming a second communication connection with the electronic device 101, to cause the external electronic device 102 to execute the first specific function corresponding to the first pattern. For example, referring to FIG. 8A, when a user wears the electronic device 101 and draws a trace using the stylus pen 600 on an external electronic device 102 (e.g., a smartphone), based on detecting the first pattern 810 from the rear part 610 of the stylus pen 600, the electronic device 101 may transmit a command to the external electronic device 102 to cause the external electronic device 102 to display, on the display of the external electronic device 102, a trace having a color (e.g., white) corresponding to a specific direction (e.g., upper side) in the first pattern 810 to correspond to the trace of the stylus pen 600. According to various embodiments, the external electronic device 102 may execute a first specific function based on the command received from the electronic device 101. For example, referring to FIG. 8A, the external electronic device 102 may identify the data regarding the first pattern 810 and the position at which a trace is to be displayed in the display thereof based on the command received from the electronic device 101, and may display, on the display thereof, a color (e.g., white) corresponding to the specific direction (e.g., upper side) in the first pattern 810 to corresponding to the trace of the stylus pen 600.

In operation 707, according to various embodiments, the electronic device 101 (e.g., the processor 120 in FIG. 1) may detect at least one of a second specific color or a second specific shape from at least one surface of the stylus pen 600 using the camera module 180. According to various embodiments, the electronic device 101 may detect at least one of a second specific color different from the first specific color or a second specific shape different from the first specific shape from at least one surface of the stylus pen 600.

According to various embodiments, while the user uses the stylus pen 600, the electronic device 101 (e.g., the processor 120 of FIG. 1) may detect that a color pattern and/or a shape pattern implemented in the rear part 610 of the stylus pen 600 is changed from the first pattern to the second pattern. For example, referring to FIGS. 8A and 8B, when the user who has used the stylus pen 600 in the direction of the first pattern 810 and/or 850 rotates the stylus pen 600 counterclockwise and uses the stylus pen 600 in the direction of the second pattern 820 and/or 860 while using, the electronic device 101 may detect that a color pattern and/or a shape pattern implemented in the rear part 610 of the stylus pen 600 is changed from the first pattern 810 and/or 850 to the second pattern 820 and/or 850.

According to various embodiments, while the user uses the stylus pen 600, the electronic device 101 (e.g., the processor 120 of FIG. 1) may detect that a color pattern and/or a shape pattern implemented in the side part 630 of the stylus pen 600 is changed from the first pattern to the second pattern. For example, referring to FIGS. 8A and 8B, when the user who has used the stylus pen 600 in the direction of the first pattern 810 and/or 850 rotates the stylus pen 600 counterclockwise and uses the stylus pen 600 in the direction of the second pattern 820 and/or 860 while using the stylus pen 600, the electronic device 101 may detect that a color pattern and/or a shape pattern implemented in the side part 630 of the stylus pen 600 is changed from the first pattern 810 and/or 850 to the second pattern 820 and/or 850.

According to various embodiments, the electronic device 101 (e.g., the processor 120 of FIG. 1) may detect that a color pattern and/or a shape pattern implemented on the stylus pen 600 is changed from the first pattern to the second pattern using hysteresis data of the color patterns and/or the shape patterns implemented in the stylus pen 600. For example, the electronic device 101 may detect that a color pattern and/or a shape pattern implemented on the stylus pen 600 is changed from the first pattern to the second pattern when the second color 632 is detected over a predetermined area or the second shape 642 reaches a predetermined position, rather than detecting a change from the first pattern to the second pattern immediately upon detecting the second color 632 and/or the second shape 642 from the stylus pen 600.

According to various embodiments, the electronic device 101 (e.g., the processor 120 of FIG. 1) may detect that a color pattern implemented in the side part 630 of the stylus pen 600 is changed from the first pattern to the second pattern using a slit 811 implemented in the stylus pen 600. According to various embodiments, in the stylus pen 600, slits 811 may be implemented at respective boundary lines of colors in order to distinguish respective colors of the side part 630. For example, referring to FIG. 8B, in the stylus pen 600, slits 811 may be implemented at respective boundary lines of colors, and when recognizing the slits 811 from a first position (e.g., edges of the stylus pen 600), the electronic device 101 may detect that a color pattern implemented in the side part 630 of the stylus pen 600 is changed from the first pattern to the second pattern. As another example, when recognizing the slit 811 from a second position (e.g., a central portion of the stylus pen 600) of the stylus pen 600 as the user rotates the stylus pen 600, the electronic device 101 may determine that the color pattern implemented in the side part 630 of the stylus pen 600 is maintained at the first pattern rather than being changed from the first pattern to the second pattern. According to various embodiments, the slits 811 implemented in the stylus pen 600 may be implemented in a color different from the plurality of colors implemented in the side part 630 of the stylus pen 600 to be easily recognized by the electronic device 101, or may be implemented with a material that can be easily recognized by the electronic device 101.

In operation 709, according to various embodiments, the electronic device 101 (e.g., the processor 120 in FIG. 1) may execute a second specific function based on detecting at least one of the second specific color or the second specific shape.

According to various embodiments, based on detecting the second pattern corresponding to at least one of the second specific color or the second specific shape, the electronic device 101 may execute the second specific function corresponding to the second pattern. For example, referring to FIGS. 8A and 8B, based on detecting the second pattern 820 and/or 860 (e.g., the second color pattern and/or the second shape pattern) from at least one surface of the stylus pen 600, the electronic device 101 may execute the second specific function corresponding to the second pattern 820 and/or 860. For example, referring to FIGS. 8A and 8B, when the second pattern 820 and/or 860 is detected, the electronic device 101 may display, on the display 160, a trace having a color (e.g., red) corresponding to a specific direction (e.g., upper side) in the second pattern 820 and/or 860 to correspond to the trace of the stylus pen 600.

According to various embodiments, in the case in which the electronic device 101 (e.g., the processor 120 of FIG. 1) is a wearable electronic device, based on detecting the second pattern corresponding to at least one of the second specific color or the second specific shape from the stylus pen 600, the electronic device 101 may transmit a command to an external electronic device 102, which is forming a second communication connection with the electronic device 101, to cause the external electronic device 102 to execute the second specific function corresponding to the second pattern.

Figure 9:
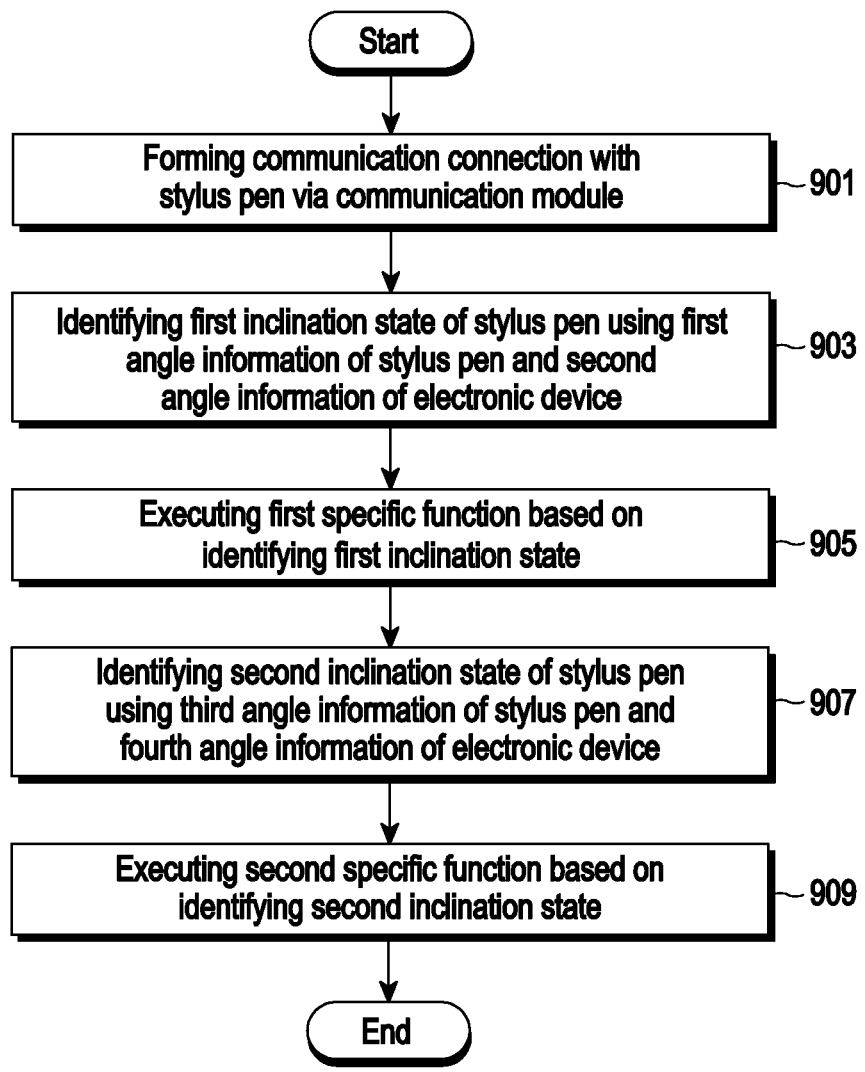
FIG. 9 is a flowchart for describing an operation of executing a plurality of functions of an electronic device using angle information detected by the electronic device from a stylus pen according to various embodiments of the disclosure.

FIG. 9 is a flowchart for describing an operation for executing a plurality of functions of an electronic device (e.g., the electronic device 101 in FIG. 1) using angle information detected by the electronic device from a stylus pen (e.g., the stylus pen 600 in FIG. 6) according to various embodiments of the disclosure.

In operation 901, according to various embodiments, the electronic device 101 (e.g., the processor 120 in FIG. 1) is a smartphone-type electronic device, and may establish a communication connection with the stylus pen 600 via a communication circuitry (e.g., the communication circuitry 190 in FIG. 1). For example, the electronic device 101 may establish a communication connection with the stylus pen 600 via a Bluetooth communication circuitry.

In operation 903, according to various embodiments, the electronic device 101 (e.g., the processor 120 in FIG. 1) may identify a first inclination state of the stylus pen 600 using first angle information of the stylus pen 600 and second angle information of the electronic device 101.

According to various embodiments, the electronic device 101 (e.g., the processor 120 of FIG. 1) may acquire the first angle information of the stylus pen 600 and the second angle information of the electronic device 101. According to various embodiments, the electronic device 101 may acquire the first angle information regarding the posture state of the stylus pen 600 from the stylus pen 600 via the communication circuitry 190. For example, the stylus pen 600 may detect the first angle information thereof using a sensor module (e.g., an acceleration sensor and/or a gyro sensor) provided therein, and may transmit the detected first angle information to the electronic device 101. According to various embodiments, the electronic device 101 may detect the second angle information regarding the posture state thereof using an acceleration sensor and/or a gyro sensor included in a sensor module (e.g., the sensor module 176 in FIG. 1).

According to various embodiments of the disclosure, the electronic device 101 (e.g., the processor 120 of FIG. 1) may identify the first inclination state of the stylus pen 600 with respect to the electronic device 101 based on the first angle information and the second angle information. For example, the electronic device 101 may identify the first inclination state of the stylus pen 600 with respect to the electronic device 101 based on the first angle information (e.g., x axis: 0 degrees, y axis: −45 degrees, and z axis: 45 degrees) and the second angle information (e.g., x axis: 0 degrees, the y axis: 0 degrees, and z axis: 90 degrees).

In operation 905, according to various embodiments, the electronic device 101 (e.g., the processor 120 of FIG. 1) may execute the first specific function based on identifying the first inclination state.

According to various embodiments, based on detecting a first grip shape corresponding to the first inclination state of the stylus pen 600, the electronic device 101 may execute the first specific function corresponding to the first grip shape. For example, based on detecting the first grip shape corresponding to the first inclination state of the stylus pen 600 (e.g., the pen is gripped to correspond to the first pattern 810 and/or 850 in FIGS. 8A and 8B), the electronic device 101 may perform the first specific function corresponding to the first grip shape. According to various embodiments, each specific function may be preset for each inclination state. According to various embodiments, each specific function may be preset by a user or a manufacturer of the electronic device 101. According to various embodiments, each specific function may exhibit a function of displaying a color corresponding to a specific direction in each inclination state on the display (e.g., the display module 160 in FIG. 1). For example, when the first inclination state of the stylus pen 600 is detected, the electronic device 101 may display, on the display module 160, a trace having a color (e.g., white) corresponding to the first inclination state to correspond to the trace of the stylus pen 600.

In operation 907, according to various embodiments, the electronic device 101 (e.g., the processor 120 in FIG. 1) may identify a second inclination state of the stylus pen 600 using third angle information of the stylus pen 600 and fourth angle information of the electronic device 101.

According to various embodiments, the electronic device 101 (e.g., the processor 120 of FIG. 1) may acquire the third angle information of the stylus pen 600 and the fourth angle information of the electronic device 101. According to various embodiments, the electronic device 101 may acquire the third angle information regarding the posture state of the stylus pen 600 from the stylus pen 600 via the communication circuitry 190. For example, the stylus pen 600 may detect the third angle information thereof using a sensor module provided therein, and may transmit the detected third angle information to the electronic device 101. According to various embodiments, the electronic device 101 may detect the fourth angle information regarding the posture state thereof using a sensor module 176 (e.g., an acceleration sensor and/or a gyro sensor).

According to various embodiments of the disclosure, the electronic device 101 (e.g., the processor 120 of FIG. 1) may identify that the inclination state of the stylus pen 600 with respect to the electronic device 101 is changed from the first inclination state to the second inclination state based on the third angle information and the fourth angle information. For example, when the user rotates the stylus pen 600 clockwise by 45 degrees, the angle information of the stylus pen 600 may be changed from the first angle information to the third angle information (e.g., x axis: −45 degrees, y axis: −45 degrees, and z axis: 0 degrees), the angle information of the electronic device 101 may be maintained at the fourth angle information (e.g., x axis: 0 degrees, y axis: 0 degrees, z axis: 90 degrees), which is the same as the second angle information, and the electronic device 101 may identify that the inclination state of the stylus pen 600 with respect to the electronic device 101 is changed from the first inclination state to the second inclination state based on the third angle information and the fourth angle information.

According to various embodiments, the electronic device 101 (e.g., the processor 120 of FIG. 1) may identify that the inclination state of the stylus pen 600 with respect to the electronic device 101 using the hysteresis data regarding the inclination state of the stylus pen 600 when a predetermined range from the first angle information is exceeded or a predetermined range from the second angle information is exceeded, rather than identifying that the first inclination state is changed to the second inclination state immediately when the first angle information of the stylus pen 600 or the second information of the electronic device 101 is changed.

In operation 909, according to various embodiments, the electronic device 101 (e.g., the processor 120 of FIG. 1) may execute the second specific function based on identifying the second inclination state.

According to various embodiments, based on detecting a second grip shape corresponding to the second inclination state of the stylus pen 600, the electronic device 101 may execute the second specific function corresponding to the second grip shape. For example, based on detecting that the grip shape of the stylus pen 600 is changed from the first grip shape (e.g., the shape in which the pen is gripped to correspond to the first pattern 810 and/or 850 in FIGS. 8A and 8B) corresponding to the first inclination state to the second grip shape (e.g., the shape in which the pen is gripped to correspond to the fourth pattern 840 and/or 880 in FIGS. 8A and 8B) corresponding to the second inclination state, the electronic device 101 may execute the second specific function corresponding to the second grip shape. For example, when the second inclination state of the stylus pen 600 is detected, the electronic device 101 may display, on the display module 160, a trace having a color (e.g., black) corresponding to the second inclination state to correspond to the trace of the stylus pen 600.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to various embodiments of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to various embodiments, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to various embodiments, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments, an electronic device (e.g., the electronic device 101 in FIG. 1) may include a communication circuitry (e.g., the communication circuitry 190 in FIG. 1), a display (e.g., the display module 160 in FIG. 1), a camera (e.g., the camera module 180 in FIG. 1), and a processor (e.g., the processor 120 in FIG. 1) operatively connected to the communication circuitry, the display, and the camera, wherein the processor may be configured to detect at least one of a first specific color or a first specific shape from at least one surface of a stylus pen (e.g., the stylus pen 600 in FIG. 6) using the camera, and to execute a first specific function based on detecting the at least one of the first specific color or the first specific shape.

According to various embodiments, the processor may be configured to detect at least one of a color pattern corresponding to the first specific color or a shape pattern corresponding to the first specific shape from a rear part (e.g., the rear part 610 of FIG. 6) or a side part (e.g., the side part 630 of FIG. 6) of the stylus pen.

According to various embodiments, the processor may be configured to display, on the display, a trace having a color corresponding to at least one of the color pattern or the shape pattern to correspond to a trace of the stylus pen.

According to various embodiments, the processor may be configured to calculate position information of a tip of the stylus pen in augmented reality displayed through the display using first data regarding a distance from the tip of the stylus pen to the rear part of the stylus pen, second data regarding a difference between angle information of the stylus pen and angle information of the electronic device, third data regarding simultaneous localization and mapping (SLAM) data of the electronic device, and fourth data regarding a distance from the electronic device to the rear part of the stylus pen, and to execute the first specific function using the position information of the tip of the stylus pen.

According to various embodiments, the processor may be configured to detect at least one of a second specific color different from the first specific color or a second specific shape different from the first specific shape from the at least one surface of the stylus pen using the camera, and to execute a second specific function based on the detecting of the at least one of the second specific color or the second specific shape.

According to various embodiments, the processor may be configured to detect at least one of a color pattern corresponding to the second specific color or a shape pattern corresponding to the second specific shape from a rear part or a side part of the stylus pen.

According to various embodiments, the processor may be configured to detect, using hysteresis data of a color pattern and/or a shape pattern implemented in a rear part or a side part of the stylus pen, changing of the color pattern and/or the shape pattern implemented in the stylus pen from a first pattern to a second pattern.

According to various embodiments, the processor may be configured to detect changing of a color pattern implemented in a side part of the stylus pen from a first pattern to a second pattern using a slit (e.g., the slit 811 in FIG. 8B) implemented in a side part of the stylus pen.

According to various embodiments, the processor may be configured to detect, when the slit is recognized from a first position of the side part of the stylus pen, the changing of the color pattern implemented in the side part of the stylus pen from the first pattern to the second pattern.

According to various embodiments, the processor may be configured to form a Bluetooth communication connection with the stylus pen via the communication circuitry, and to acquire angle information of the stylus pen from the stylus pen via the Bluetooth communication connection.

According to various embodiments, a method of operating an electronic device including a communication circuitry, a display, and a camera may include an operation of detecting at least one of a first specific color or a first specific shape from at least one surface of a stylus pen using the camera, and an operation of executing a first specific function based on detecting the at least one of the first specific color or the first specific shape.

According to various embodiments, the operation of detecting the at least one of the first specific color or the first specific shape may include an operation of detecting at least one of a color pattern corresponding to the first specific color or a shape pattern corresponding to the first specific shape from a rear part or a side part of the stylus pen.

According to various embodiments, the method may further include an operation of displaying, on the display, a trace having a color corresponding to at least one of the color pattern or the shape pattern to correspond to a trace of the stylus pen.

According to various embodiments, the method may further include an operation of calculating position information of a tip of the stylus pen in augmented reality displayed through the display using first data regarding a distance from the tip of the stylus pen to the rear part of the stylus pen, second data regarding a difference between angle information of the stylus pen and angle information of the electronic device, third data regarding simultaneous localization and mapping (SLAM) data of the electronic device, and fourth data regarding a distance from the electronic device to the rear part of the stylus pen, and an operation of executing the first specific function using the position information of the tip of the stylus pen.

According to various embodiments, the method may further include an operation of detecting at least one of a second specific color different from the first specific color or a second specific shape different from the first specific shape from the at least one surface of the stylus pen using the camera, and an operation of executing a second specific function based on the detecting of the at least one of the second specific color or the second specific shape.

According to various embodiments, the operation of detecting the at least one of the second specific color or the second specific shape may include an operation of detecting at least one of a color pattern corresponding to the second specific color or a shape pattern corresponding to the second specific shape from a rear part or a side part of the stylus pen.

According to various embodiments, the method may further include an operation of detecting, using hysteresis data of a color pattern and/or a shape pattern implemented in a rear part or a side part of the stylus pen, changing of the color pattern and/or the shape pattern implemented in the stylus pen from a first pattern to a second pattern.

According to various embodiments, the method may further include an operation of detecting changing of a color pattern implemented in a side part of the stylus pen from a first pattern to a second pattern using a slit implemented in a side part of the stylus pen.

According to various embodiments, the method of detecting the changing of the color pattern from the first pattern to the second pattern may include an operation of detecting, when the slit is recognized from a first position of the side part of the stylus pen, the changing of the color pattern implemented in the side part of the stylus pen from the first pattern to the second pattern.

According to various embodiments, the method may include an operation of forming a Bluetooth communication connection with the stylus pen via the communication circuitry, and an operation of acquiring angle information of the stylus pen from the stylus pen via the Bluetooth communication connection.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:
   a communication circuitry;
   a display;
   a camera; and
   a processor operatively connected to the communication circuitry, the display and the camera,
   wherein the processor is configured to:
      detect, using the camera, at least one of a first specific color or a first specific shape from a first surface of a stylus pen, which includes a plurality of surfaces including a plurality of colors and a plurality of shapes, respectively,
      execute a first specific function based on detecting the at least one of the first specific color or the first specific shape,
      detect, using the camera, at least one of a second specific color or a second specific shape from a second surface of the stylus pen, the first specific color different from the second specific color or the second specific shape different from the first specific shape, and
      execute a second specific function based on detecting the at least one of the second specific color or the second specific shape.

2. The electronic device of claim 1, wherein the processor is further configured to detect at least one of a color pattern corresponding to the first specific color or a shape pattern corresponding to the first specific shape from a rear part or a side part of the stylus pen.

3. The electronic device of claim 2, wherein the processor is further configured to display, on the display, a trace having a color corresponding to at least one of the color pattern or the shape pattern to correspond to a trace of the stylus pen.

4. The electronic device of claim 1, wherein the processor is further configured to:
   calculate position information of a tip of the stylus pen in augmented reality displayed through r regarding a distance from the tip of the stylus pen to a rear part of the stylus pen, second data regarding a difference between angle information of the stylus pen and angle information of the electronic device, third data regarding simultaneous localization and mapping (SLAM) data of the electronic device, and fourth data regarding a distance from the electronic device to the rear part of the stylus pen, and
   execute the first specific function using the position information of the tip of the stylus pen.

5. The electronic device of claim 1, wherein the processor is further configured to detect at least one of a color pattern corresponding to the second specific color or a shape pattern corresponding to the second specific shape from a rear part or a side part of the stylus pen.

6. The electronic device of claim 1, wherein the processor is further configured to detect, using hysteresis data of a color pattern or a shape pattern implemented in a rear part or a side part of the stylus pen, changing of the color pattern or the shape pattern implemented in the stylus pen from a first pattern to a second pattern.

7. The electronic device of claim 1, wherein the processor is further configured to detect changing of a color pattern implemented in a side part of the stylus pen from a first pattern to a second pattern using a slit implemented in a side part of the stylus pen.

8. The electronic device of claim 7, wherein the processor is further configured to detect, when the slit is recognized from a first position of the side part of the stylus pen, the changing of the color pattern implemented in the side part of the stylus pen from the first pattern to the second pattern.

9. The electronic device of claim 1, wherein the processor is further configured to:
   form a Bluetooth communication connection with the stylus pen via the communication circuitry, and acquire angle information of the stylus pen from the stylus pen via the Bluetooth communication connection.

10. A method of operating an electronic device including a communication circuitry, a display, and a camera, the method comprising:
   detecting, using the camera, at least one of a first specific color or a first specific shape from a first surface of a stylus pen, which includes a plurality of surfaces including a plurality of colors and a plurality of shapes, respectively;
   executing a first specific function based on detecting the at least one of the first specific color or the first specific shape,
   detecting, using the camera, at least one of a second specific color or a second specific shape from a second surface of the stylus pen, the first specific color different from the second specific color or the second specific shape different from the first specific shape; and
   executing a second specific function based on detecting the at least one of the second specific color or the second specific shape.

11. The method of claim 10, wherein the detecting of the at least one of the first specific color or the first specific shape comprises:
   detecting at least one of a color pattern corresponding to the first specific color or a shape pattern corresponding to the first specific shape from a rear part or a side part of the stylus pen; and
   displaying, on the display, a trace having a color corresponding to at least one of the color pattern or the shape pattern to correspond to a trace of the stylus pen.

12. The method of claim 11, further comprising:
   displaying, on the display, a trace having a color corresponding to at least one of the color pattern or the shape pattern to correspond to a trace of the stylus pen.

13. The method of claim 10, further comprising:
   calculating position information of a tip of the stylus pen in augmented reality displayed through the display using first data regarding a distance from the tip of the stylus pen to a rear part of the stylus pen, second data regarding a difference between angle information of the stylus pen and angle information of the electronic device, third data regarding simultaneous localization and mapping (SLAM) data of the electronic device, and fourth data regarding a distance from the electronic device to the rear part of the stylus pen; and
   executing the first specific function using the position information of the tip of the stylus pen.

14. The method of claim 10, wherein the detecting of the at least one of the second specific color or the second specific shape comprises:
   detecting at least one of a color pattern corresponding to the second specific color or a shape pattern corresponding to the second specific shape from a rear part or a side part of the stylus pen.

15. The method of claim 10, further comprising:
   detecting, using hysteresis data of at least one of a color pattern or a shape pattern implemented in a rear part or a side part of the stylus pen, changing of the at least one of the color pattern or the shape pattern implemented in the stylus pen from a first pattern to a second pattern.

16. The method of claim 10, further comprising:
   detecting changing of a color pattern implemented in a side part of the stylus pen from a first pattern to a second pattern using a slit implemented in a side part of the stylus pen.

17. The method of claim 16, wherein the detecting of the changing of the color pattern from the first pattern to the second pattern comprises:
   detecting, when the slit is recognized from a first position of the side part of the stylus pen, the changing of the color pattern implemented in the side part of the stylus pen from the first pattern to the second pattern.

18. The method of claim 10, further comprising:
   forming a Bluetooth communication connection with the stylus pen via the communication circuitry; and
   acquiring angle information of the stylus pen from the stylus pen via the Bluetooth communication connection.

\* \* \* \* \*